United States Patent

[11] 3,569,762

[72] Inventors Albert K. Levine
 Beechhurst, Queens;
 Frank C. Palilla, Maspeth, N.Y.
[21] Appl. No. 379,577
[22] Filed July 1, 1964
[45] Patented Mar. 9, 1971
[73] Assignee General Telephone and Electronics
 Laboratories, Inc.
 Continuation-in-part of application Ser. No.
 334,565, Dec. 30, 1963, now abandoned.

[54] ELECTRON DISCHARGE LAMPS WITH RARE EARTH PHOSPHOR COATING
 13 Claims, 1 Drawing Fig.
[52] U.S. Cl. .................................................. 313/109,
 252/301.2
[51] Int. Cl. ....................................................... H01j 1/62,
 H01j 63/04
[50] Field of Search ......................................... 252/301.4;
 313/108, 109, 25, 220, 92, 227

Primary Examiner—Robert Segal
Attorneys—Robert J. Frank and Theodore C. Jay, Jr.

ABSTRACT: 1. A fluorescent electric discharge lamp comprising (a) an arc tube discharge source, (b) a transparent outer envelope surrounding said discharge source, and (c) a phosphor coating on the inside surface of said outer envelope, said phosphor being composed of a host crystal consisting essentially of a vanadate of a trivalent metal selected from the group consisting of yttrium, gadolinium and lutetium, said host crystal being activated by a trivalent rare-earth element selected from the group consisting of europium and samarium.

PATENTED MAR 9 1971
3,569,762
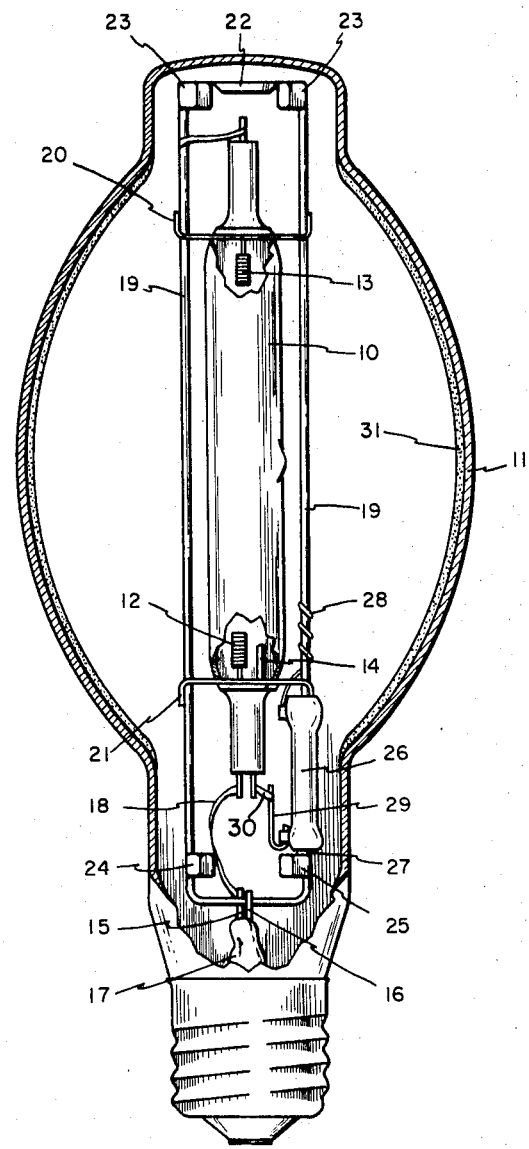
INVENTOR.
ALBERT K. LEVINE
FRANK C. PALLILA
BY
R. J. Frank
ATTORNEY.

ELECTRON DISCHARGE LAMPS WITH RARE EARTH PHOSPHOR COATING

This application is a continuation-in-part of U.S. Pat. application Ser. No. 334,565 filed Dec. 30, 1963, now abandoned.

This invention relates to fluorescent electric discharge lamps and in particular to high-pressure mercury lamps in which phosphors composed of trivalent metal vanadates activated with trivalent rare-earth elements are employed for color correction.

High-pressure mercury vapor lamps (hereinafter called HPMV lamps) are strong emitters of blue, green and yellow light but are poor emitters of red light. Consequently, unless corrected for this deficiency, they distort the true colors of many objects and are not suitable for applications in which good color rendition is necessary. HPMV lamps are also excellent emitters of ultraviolet radiation and therefore a number of phosphors have been developed which take advantage of this characteristic by emitting red light in response to excitation by ultraviolet radiation. These color-correcting phosphors are generally placed on the inner surface of a transparent envelope surrounding the arc tube discharge source.

To be suitable for use as a color corrector of this type, the phosphor should respond efficiently to excitation by the ultraviolet component of the mercury vapor emission. This component is principally in the range between 230 and 380 millimicrons and is especially intense at 313 and 366 millimicrons. The phosphor must also maintain high efficiency at the operating temperature of the lamp envelope (150° C. to 350° C.) and should not decrease significantly in efficiency after several thousand hours of operation. In addition, attenuation of the visible light emitted by the mercury arc should be as low as possible.

One phosphor material which has been used as a color corrector in HPMV lamps is magnesium fluorogermanate activated by tetravalent manganese. This phosphor emits a deep red color when excited by ultraviolet radiation but significantly attenuates the visible light emitted by the discharge. More specifically, the fluorogermanate phosphor introduces new bands of radiation in the red region but the peak of this radiation occurs at 662 millimicrons where the sensitivity of the eye is very low. The added emission in the red region is not sufficient to compensate for the attenuation of the shorter visible wavelengths of the mercury emission at 546 and 436 millimicrons and consequently, the efficiency measured in lumens of light output per watt of input power is lower for the fluorogermanate coated lamp than for the uncoated lamp.

Another material which has been used for color correction is tin-activated calcium zinc phosphate. This phosphor presents the advantage that the red component added to the mercury arc emission above 590 millimicrons together with its broad spectrum of emission below this wavelength is large enough to offset the attenuation of the shorter wavelength mercury lines at 546 and 436 millimicrons thereby resulting in an overall increase in efficiency as compared to an uncoated lamp. However, the ratio of the lumens of red light above 590 millimicrons emitted by a lamp employing calcium zinc phosphate as a color corrector to the total lumens output of the lamp is considerably less than is obtained with the fluorogermanate phosphor.

Accordingly, it is an object of our invention to provide an improved color-corrected fluorescent electric discharge lamp. More particularly, it is an object of the invention to provide an HPMV lamp having a light output which includes a higher percentage of emission in the red region than prior lamps, and which exhibits higher overall efficiency.

We have discovered that certain phosphors composed of a host crystal consisting essentially of a vanadate of a trivalent metal activated with selected trivalent rare-earth elements can be combined with high-pressure mercury lamps to provide a light output having frequency components distributed over the entire visible spectrum. The trivalent metal vanadates which have been found most satisfactory are yttrium vanadate and gadolinium vanadate and the preferred activator is europium. However, lutetium may be substituted for yttrium or gadolinium and samarium may be substituted for the europium activator. These phosphors may be represented by the formula $(A_{1-x}B_x)VO_4$, where $A$ is yttrium (Y), gadolinium (Gd), or lutetium (Lu), $B$ is europium (Eu) or samarium (SM) and $x$ is between 0.002 and 0.2. It has been found, for example, that an HPMV lamp having the inside of its outer envelope coated with europium-activated yttrium vanadate emits light over the entire visible spectrum and in particular possesses a peak at 618 millimicrons which represents a practically pure red emission. The ultraviolet excitation peak for this phosphor is at 320 millimicrons resulting in highly efficient excitation by the principal ultraviolet mercury arc emission at 313 millimicrons. Attenuation of the 405, 436, and 546 millimicron lines is lower than for lamps using either magnesium fluorogermanate or calcium zinc phosphate as color correctors, the lower attenuation being especially pronounced at 546 millimicrons which lies near the peak of the eye sensitivity. This low attenuation is believed primarily due to the light body color and high efficiency of the europium-activated yttrium vanadate which permits a relatively thin phosphor coating to be used on the inner surface of the lamp envelope.

The europium-activated yttrium vanadate has an emission intensity which varies with temperature and has a peak at about 200° C. or higher. This peak temperature is in the neighborhood of the average temperature of the part of the lamp in which the coating is placed and therefore contributes to efficient operation. Further, the phosphor is relatively insensitive to contamination and displays good chemical and physical stability.

Another important feature relates to the ease with which the phosphor not actually deposited on the lamp envelope can be recovered. It has been found that virtually all of the excess phosphor can be recovered and reused since it is easily separated from the organic binder used to deposit it on the envelope surface and its characteristics are not changed by the manufacturing or recovery processes.

Europium-activated yttrium vanadate when viewed as a powder under ultraviolet excitation emits an orange-red light as compared to the deep red emitted by the manganese-activated fluorogermanate. However, when this phosphor is employed as a coating in combination with a high-pressure mercury vapor lamp, the percentage of visible red light emitted is greater than that emitted by lamps using the fluorogermanate phosphor.

The above objects of and the brief introduction to the present invention will be more fully understood and further objects and advantages will become apparent from a study of the following description in connection with the drawing.

Referring to the FIGURE, there is shown a high-pressure mercury vapor lamp comprising an arc tube 10 surrounded by a transparent outer envelope 11. The arc tube 10 is provided with main electrodes 12 and 13 at each end and an auxiliary electrode 14 located adjacent main electrode 12. Tube 10 is filled with a mixture of mercury and an inert gas.

A pair of lead-wires 15 and 16 are introduced into the lamp through a stem press 17, lead-wire 15 being connected to electrode 12 of the arc tube by a metal ribbon 18 and lead-wire 16 being attached to a U-shaped support wire 19. The arc tube 10 is supported by collars 20 and 21 which encircle the tube and are secured to the U-shaped wire 19. Wire 19 is reinforced by a plate 22 which bridges the free ends of the wire and is supported by resilient metal fingers 23, 24, and 25 which are attached to the wire and frictionally engage the inner wall of envelope 11. A resistor 26 is seated on an insulator button 27 which, in turn, is supported by metal fingers 25. Lead-wire 28 is wound around and welded to support wire 19 and lead-wire 29 is welded to metal ribbon 30 which is connected to auxiliary electrode 14.

A coating 31 of a phosphor defined by the formula $(A_{1-x}B_x)VO_4$, where $A$ is yttrium, gadolinium or lutetium, $B$ is europium or samarium, and $x$ is between 0.002 and 0.2 is deposited on the inner surface of envelope 11. For example, yttrium vanadate activated by 5 mole percent europium may be employed for color correction in an HPMV lamp of this type. The phosphor is prepared by blending 561.55 grams of ammonium vanadate $NH_4VO_3$, 257.46 grams of yttrium oxide $Y_2O_3$ and 21.12 grams of europium oxide $Eu_2O_3$ and then firing the blend in air in a quarts crucible to a temperature of about 950° C. for approximately 2 hours. After the material has cooled, it is placed in a beaker and washed two or three times in hot 10 percent sodium hydroxide solution. This is followed by four to five washings with distilled or de-ionized water after which it is dried and passed through a 325 sieve. As stated, the europium concentration in the phosphor obtained by this process is 5 mole percent although the concentration may be in the range 1 to 20 percent. Excess ammonium vanadate was used to obtain the ratio of vanadium to yttrium of 2:1 in the original blend, the ammonium vanadate acting both as a flux and as a reactant. The use of excess vanadium permits close control of particle size to be obtained at relatively low temperatures. This excess is removed by an alkali wash after the thermal treatment. The size of the phosphor particle found most effective in HPMV lamps is in the range 1 to 15 microns, the preferred average particle size being about 8 microns.

The coating 32 is prepared by making a suspension of the phosphor in a nitrocellulose-acetone solution containing dimethylphthlate as a plasticizer and a highly purified powderized amorphous silica of extremely small particle size such as that sold by Corona Chemical Division of Pittsburg Plate Glass under the trade name 0233 Microsized Hy-Sil. This suspension is sprayed upward against the inside of envelope 11 so that the suspension adheres to the envelope and the excess flows out at the base of the lamp. The lamp is then baked at about 500° C. for approximately 4—6 minutes to drive off the organic material leaving only a thin coating of the phosphor on the inside of envelope 11.

EXAMPLE I

A number of HPMV lamps were prepared in which a color-correcting phosphor having the composition $(Y_{.95}Eu_{.05})VO_4$ was incorporated. The light output of these lamps was measured with a photometer corrected for the response of the human eye and this output compared with that of conventional clear lamps and with lamps employing manganese-activated magnesium fluorogermanate, $Mg_8F_2Ge_2O_{11}$:Mn, and tin-activated calcium zinc phosphate, $(Ca,Zn)_3(PO_4)_2$:Sn, for color correction. In addition, the percentage of red light emitted by each of the lamps was measured using a Corning filter identified by color specification H.R.2–61. This filter has a cutoff at about 600 millimicrons, passes approximately 60 percent of the light at 620 millimicrons and 90 percent at 640 millimicrons. (It should be noted that the filter attenuates the transmission of the fluorogermanate phosphor by only about 10 percent at its peak emission wavelength of 662 millimicrons but attenuates the peak emission at 618 millimicrons of the europium-activated yttrium vanadate by about 40 percent. Nevertheless, the measured percentage of red light emitted by the HPMV lamps employing europium-activated yttrium vanadate is higher than that measured for lamps using the fluorogermanate phosphor.) The following table gives the average measured efficiency in lumens per watt of input power and percentage of red emission for our lamps, lamps employing other color-correcting phosphors, and for lamps which do not employ any color-correcting phosphor. The measurements were made immediately after the lamps were first energized and after 100 hours of operation.

TABLE I

| Color-correcting phosphor | Initial | | After 100 hours | |
|---|---|---|---|---|
| | Efficiency in lumens/watt | Red emission in percent | Efficiency in lumens/watt | Red emission in percent |
| None | 52.9 | | 50.5 | |
| $Mg_8F_2Ge_2O_{11}$:Mn | 52.0 | 4.61 | 50.0 | 4.59 |
| $(Ca,Zn)_3(PO_4)_2$:Sn | 56.8 | 2.15 | 52.7 | 1.77 |
| $(Y_{.95}Eu_{.05})VO_4$ | 57.7 | 5.55 | 55.0 | 5.42 |

As indicated, lamps employing $(Y_{.95}Eu_{.05})VO_4$ as a color-correcting phosphor are not only more efficient than the lamps incorporating the most efficient previously known phosphor, calcium zinc phosphate, but also emit a higher percentage of red light than those using magnesium fluorogermanate. In addition, the phosphor coating required in lamps employing europium-activated yttrium vanadate is thinner than in lamps using other phosphor coatings resulting in higher light transmission and more economic use of the phosphor. Light transmission measurements show that the europium-activated yttrium vanadate coating transmits 60 to 65 percent of the light which passes through a clear HPMV lamp envelope whereas the light transmission through envelopes coated with magnesium fluorogermanate or calcium zinc phosphate is only about 45 to 55 percent.

The phosphor which is not coated on the inside of envelope 11 may be recovered by baking the excess suspension at 450° C. for 1 hour until all organic matter is removed. It has been found that this process results in almost complete recovery of the phosphor and the recovered material has essentially the same luminescent properties as the original composition.

A demountable HPMV lamp was also tested using the same phosphors as were employed in making the measurements listed in Table I. In this lamp, the same mercury arc is used to excite each phosphor thereby preventing variations in lamp characteristics from affecting the results. In each case, the density of the phosphor coating was 7 milligrams per square centimeter.

The light output was measured using a photometer corrected for the response of the human eye and was normalized with respect to the brightness of emission from a clear lamp which did not employ a color-correcting phosphor. The percentage of red light was measured through a Corning CS2–63 filter which transmits about 90 percent of the radiation having wavelengths above 620 millimicrons. This filter provided a more realistic evaluation of the red component than the type H.R. 2–61 filter used in the measurements of Table I since it transmits considerably more light at the peak emission wavelengths of the color-correcting phosphors tested. The results of these measurements are given in Table II.

TABLE II

| Color-correcting phosphor | Normalized brightness | Red emission in percent |
|---|---|---|
| None | 100 | |
| $Mg_8F_2Ge_2O_{11}$:Mn | 92.5 | 11.1 |
| $(Ca,Zn)_3(PO_4)_2$:Sn | 109.0 | 5.9 |
| $(Y_{.95}Eu_{.05})VO_4$ | 121.0 | 14.1 |

EXAMPLE II

Demountable HPMV lamps were also prepared using a europium-activated yttrium vanadate phosphor in which the vanadium-to-yttrium ratio in the original blend was approximately 1.2:1 and the average particle size about 3 microns. The density of the phosphor coatings was about 3.5 milligrams per square centimeter. A first phosphor composition was prepared in which the europium activation was approximately 5 mole percent by blending 280.77 grams of ammonium vanadate, 214.55 grams of yttrium oxide and 17.60 grams of europium oxide and firing at a temperature of about 950° C. A second phosphor composition was also prepared in which the europium activation was 3 mole percent by blending 491.35 grams of ammonium vanadate, 383.35 grams of yttrium oxide and 18.48 grams of europium oxide and firing at the same temperature. The average normalized brightness and percentage of red emission obtained using these phosphors is shown in Table III.

TABLE III

| Color-correcting phosphor | Normalized brightness | Red emission in percent |
|---|---|---|
| None | 100 | |
| $(Y_{.95}Eu_{.05})VO_4$ | 124.1 | 8.1 |
| $(Y_{.97}Eu_{.03})VO_4$ | 119.0 | 4.8 |

EXAMPLE III

A samarium-activated yttrium vanadate phosphor was used to color-correct a demountable HPMV lamp. This phosphor was activated with approximately 0.5 mole percent samarium and had a vanadium-to-yttrium ratio of 2:1 in the original blend. It was prepared by blending 233.98 grams of ammonium vanadate, 112.36 grams of yttrium oxide and 0.87 grams of samarium oxide ($Sm_2O_3$) and firing at a temperature of about 950° C. The resulting average particle size was 8 microns and the density of the phosphor coating about 7 milligrams per square centimeter. The brightness and percentage of red emission obtained is shown in Table IV.

TABLE IV

| Color-correcting phosphor | Normalized brightness | Red emission in percent |
|---|---|---|
| Clear | 100 | |
| $(Y_{.995}Sm_{.005})VO_4$ | 91.9 | 3.7 |

A demountable HPMV lamp was prepared using europium-activated gadolinium vanadate for color correction. This phosphor was activated with 5 mole percent europium and had a vanadium-to-gadolinium ratio of about 2:1 in the original blend. It was prepared by blending 701.94 grams of ammonium vanadate, 526.43 grams of gadolinium vanadate ($Gd_2O_3$) and 15.84 grams of europium oxide and then firing at a temperature of 950° C. producing a phosphor having an average particle size of 8 microns. The density of the phosphor coating was about 7 milligrams per square centimeter. The average normalized brightness and percentage of red emission of lamps using this phosphor are shown in Table V.

TABLE V

| Color-correcting phosphor | Normalized brightness | Red emission in percent |
|---|---|---|
| Clear | 100 | |
| $(Gd_{.95}Eu_{.05})VO_4$ | 125.3 | 14.3 |

As many changes could be made in the above construction and many different embodiments could be made without departing from the scope thereof, it is intended that all matter contained in the above description or shown in the accompanying drawing shall be interpreted as illustrative and not in a limiting sense.

We claim:
1. A fluorescent electric discharge lamp comprising:
   a. an arc tube discharge source;
   b. a transparent outer envelope surrounding said discharge source; and
   c. a phosphor coating on the inside surface of said outer envelope, said phosphor being composed of a host crystal consisting essentially of a vanadate of a trivalent metal selected from the group consisting of yttrium, gadolinium and lutetium, said host crystal being activated by a trivalent rare-earth element selected from the group consisting of europium and samarium.
2. A high-pressure mercury lamp comprising:
   a. a mercury filled discharge tube;
   b. a transparent outer envelope surrounding said discharge tube and spaced therefrom; and
   c. a phosphor coating on the inside surface of said outer envelope, said phosphor being composed of a host crystal consisting essentially of a vanadate of a trivalent metal selected from the group consisting of yttrium, gadolinium, and lutetium, said host crystal being activated by a trivalent rare-earth element selected from the group consisting of europium and samarium.
3. A high-pressure mercury lamp comprising:
   a. a mercury filled discharge tube;
   b. a transparent outer envelope surrounding said discharge tube and spaced therefrom; and
   c. a phosphor coating on the inside surface of said outer envelope, said phosphor being represented by the formula $(A_{1-x}B_x)VO_4$ where $A$ is selected from the group consisting of yttrium, gadolinium, and lutetium, $B$ is selected from the group consisting of europium and samarium, and $x$ is between 0.002 and 0.2.
4. A high-pressure mercury lamp comprising:
   a. a mercury filled discharge tube;
   b. a transparent outer envelope surrounding said discharge tube and spaced therefrom; and
   c. a color-correcting phosphor coating on the inside surface of said outer envelope, said phosphor coating consisting essentially of yttrium vanadate activated with between 1 and 20 mole percent europium.
5. A high-pressure mercury lamp comprising:
   a. a mercury filled discharge tube;
   b. a transparent outer envelope surrounding said discharge tube and spaced therefrom; and
   c. a color-correcting phosphor coating on the inside surface of said outer envelope, said phosphor coating consisting essentially of yttrium vanadate activated with approximately 5 mole percent europium.
6. A high-pressure mercury lamp comprising:
   a. a mercury filled discharge tube;
   b. a transparent outer envelope surrounding said discharge tube and spaced therefrom; and
   c. a color-correcting phosphor coating on the inside surface of said outer envelope, said phosphor coating consisting essentially of yttrium vanadate activated with approximately 3 mole percent europium.
7. A high-pressure mercury lamp comprising:
   a. a mercury filled discharge tube;
   b. a transparent outer envelope surrounding said discharge tube and spaced therefrom; and
   c. a color-correcting phosphor coating on the inside surface of said outer envelope, said phosphor coating consisting essentially of yttrium vanadate activated with approximately 0.5 mole percent samarium.
8. A high-pressure mercury lamp comprising:
   a. a mercury filled discharge tube;
   b. a transparent outer envelope surrounding said discharge tube and spaced therefrom; and
   c. a color-correcting phosphor coating on the inside surface of said outer envelope, said phosphor coating consisting essentially of gadolinium vanadate activated with approximately 5 mole percent europium.
9. A high-pressure mercury lamp comprising:
   a. a mercury filled discharge tube;
   b. a transparent outer envelope surrounding said discharge tube and spaced therefrom; and
   c. a phosphor coating on the inside surface of said outer envelope, said phosphor being represented by the formula $(A_{1-x}B_x)VO_4$ where $A$ is selected from the group consisting of yttrium, gadolinium, and lutetium, $B$ is selected from the group consisting of europium and samarium, and $x$ is between 0.002 and 0.2, the size of the particles of said phosphor being in the range 1 to 15 microns.
10. A high-pressure mercury lamp comprising:
    a. a mercury filled discharge tube;
    b. a transparent outer envelope surrounding said discharge tube and spaced therefrom; and
    c. a color-correcting phosphor coating on the inside surface of said outer envelope, said phosphor coating consisting essentially of yttrium vanadate activated with approximately 5 mole percent europium, the size of the particles of said phosphor being approximately 8 microns.
11. A fluorescent electron discharge lamp comprising:
    a. a transparent envelope having a phosphor coating affixed to the inner surface thereof, said phosphor coating comprising a host crystal consisting essentially of a vanadate of a trivalent metal selected from the group consisting of yttrium, gadolinium and lutetium, said host crystal being activated by a trivalent rare-earth element selected from the group consisting of europium and samarium; and b. an ultraviolet light source located within said envelope, said light source comprising first and second spaced electrodes and containing a mixture of mercury and an inert gas, said phosphor emitting light having a red component in response to excitation by said ultraviolet source.

12. A fluorescent lamp useful at a temperature of at least 300° C., having as a luminescent material therein a single-phase, solid solution of the generic formula $Eu_xGd_{1-x}VO_4$, where $x$ has a value from 0.002 to 0.2.

13. A fluorescent lamp useful at a temperature of at least 300° C., having as a luminescent material therein a phosphor of the formula $(A_{1-x}Eu_x)VO_4$ where $A$ is selected from the group consisting of yttrium and gadolinium, $x$ having a value from 0.002 to 0.2.

PO-1050
(5/69)

UNITED STATES PATENT OFFICE
CERTIFICATE OF CORRECTION

Patent No. 3,569,762    Dated March 9, 1971

Inventor(s) Albert K. Levine; Frank C. Palilla

It is certified that error appears in the above-identified patent and that said Letters Patent are hereby corrected as shown below:

Column 2, lines 4 and 70, each occurrence, the portion of formula reading "$A_{11x}$" should read --$A_{1-x}$--; line 71, the tion of the formula reading "VO4" should read --$VO_4$--. Co 3, line 24, the reference numeral "32" should read --31--; line 28, "Pittsburg" should read --Pittsburgh--; line 29, "0233" should read --#233--; line 46, the portion of the f ula reading "(PO4)2:Sn" should read --$(PO_4)_2$:Sn--; Table I first column from the left, the portion of the formula rea "Mg8" should read --$Mg_8$--. Column 6, lines 3 and 53, each occurrence, the portion of the formula reading "$A_{11xx}$" sho read --$A_{1-x}B_x$--. Column 8, line 1, the portion of the for reading "$Gd_{11x}$" should read --$Gd_{1-x}$--; line 5, the portion the formula reading "$A_{11x}$" should read --$A_{1-x}$--.

Signed and sealed this 28th day of December 1971.

(SEAL)
Attest:

EDWARD M. FLETCHER, JR.           ROBERT GOTTSCHALK
Attesting Officer                 Acting Commissioner of Patent